(12) United States Patent
Moussette et al.

(10) Patent No.: US 9,535,501 B1
(45) Date of Patent: Jan. 3, 2017

(54) INPUT WITH HAPTIC FEEDBACK

(71) Applicant: Apple Inc., Cupertino, CA (US)

(72) Inventors: Camille Moussette, Los Gatos, CA (US); John Morrell, Los Gatos, CA (US); Duncan Robert Kerr, San Francisco, CA (US); Benjamin G. Jackson, Belmont, CA (US); Steven J. Taylor, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/974,606

(22) Filed: Dec. 18, 2015

Related U.S. Application Data (63) Continuation of application No. 14/745,416, filed on Jun. 29, 2015.

(51) Int. Cl.
*G06F 3/041* (2006.01)
*G06F 3/01* (2006.01)

(52) U.S. Cl.
CPC ............... *G06F 3/016* (2013.01); *G06F 3/041* (2013.01)

(58) Field of Classification Search
CPC .......... G06F 3/016; G06F 3/03; G06F 3/0362; G06F 3/046; G06F 3/048; G06F 3/0488
See application file for complete search history.

(56) References Cited

U.S. PATENT DOCUMENTS

| | | | |
|---|---|---|---|
| 4,304,133 A * | 12/1981 | Feamster, III ......... | B23Q 1/621 73/633 |
| 5,483,261 A | 1/1996 | Yasutake | |
| 5,488,204 A | 1/1996 | Mead et al. | |
| 5,587,937 A * | 12/1996 | Massie ................... | B25J 9/1689 700/264 |
| 5,709,219 A * | 1/1998 | Chen ....................... | A63F 13/06 345/156 |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2014/200766 A1 | 12/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Joe H Cheng
(74) *Attorney, Agent, or Firm* — Morrison & Foerster LLP (57) ABSTRACT

An electronic device is disclosed. The electronic device includes a mechanical input configured to move in a first direction in response to an input at the mechanical input. A mechanical input sensor is coupled to the mechanical input and configured to sense the input at the mechanical input based on the movement of the mechanical input in the first direction. A mechanical input actuator is coupled to the mechanical input and configured to displace the mechanical input in a second direction, different from the first direction. In some examples, the second direction is orthogonal to the first direction. In some examples, the mechanical input comprises a rotary input configured to rotate in the first direction in response to the input. In some examples, the mechanical input actuator is configured to displace the mechanical input in the second direction while the mechanical input is moving in the first direction.

19 Claims, 7 Drawing Sheets

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,257,529 B1* | 7/2001 | Kubo | B64C 13/42 |
| | | | 244/194 |
| 6,310,610 B1 | 10/2001 | Beaton et al. | |
| 6,323,846 B1 | 11/2001 | Westerman et al. | |
| 6,636,197 B1 | 10/2003 | Goldenberg et al. | |
| 6,686,911 B1 | 2/2004 | Levin et al. | |
| 6,690,387 B2 | 2/2004 | Zimmerman et al. | |
| 6,956,558 B1 | 10/2005 | Rosenberg et al. | |
| 7,015,894 B2 | 3/2006 | Morohoshi | |
| 7,184,064 B2 | 2/2007 | Zimmerman et al. | |
| 7,450,110 B2* | 11/2008 | Shahoian | G06F 1/1616 |
| | | | 178/18.01 |
| 7,489,309 B2 | 2/2009 | Levin et al. | |
| 7,564,444 B2 | 7/2009 | Rosenberg et al. | |
| 7,567,243 B2 | 7/2009 | Hayward | |
| 7,663,607 B2 | 2/2010 | Hotelling et al. | |
| 8,479,122 B2 | 7/2013 | Hotelling et al. | |
| 2003/0193475 A1 | 10/2003 | Rosenberg | A63F 13/06 |
| | | | 345/156 |
| 2004/0251061 A1* | 12/2004 | Augustine | B62D 5/008 |
| | | | 180/6.2 |
| 2006/0187201 A1* | 8/2006 | Rosenberg | G05G 9/047 |
| | | | 345/156 |
| 2006/0197753 A1 | 9/2006 | Hotelling | |
| 2006/0255683 A1 | 11/2006 | Suzuki et al. | |
| 2007/0119698 A1* | 5/2007 | Day | G06F 3/038 |
| | | | 200/510 |
| 2007/0182708 A1* | 8/2007 | Poupyrev | A63F 13/02 |
| | | | 345/156 |
| 2007/0236450 A1 | 10/2007 | Colgate et al. | |
| 2008/0158149 A1 | 7/2008 | Levin | |
| 2012/0032031 A1* | 2/2012 | Grohmann | B64C 13/42 |
| | | | 244/221 |
| 2012/0249315 A1 | 10/2012 | Vanhelle et al. | |
| 2014/0139436 A1* | 5/2014 | Ramstein | G06F 3/016 |
| | | | 345/168 |

OTHER PUBLICATIONS

Levesque, V. (2000). "Demonstration of Laterotactile Principle," located at http://www.cim.mcgill.ca/~haptic/laterotactile/.principle.php, last visited on Jun. 3, 2015, one page.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

U.S. Appl. No. 14/754,416, filed Jun. 29, 2015.

U.S. Appl. No. 14/796,915, filed Jul. 10, 2015.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non Final Office Action mailed May 10, 2016, for U.S. Appl. No. 14/754,416, filed Jun. 29, 2015, 18 pages.

* cited by examiner

INPUT WITH HAPTIC FEEDBACK

CROSS-REFERENCE TO RELATED APPLICATIONS

This application is a continuation of U.S. patent application Ser. No. 14/754,416 filed Jun. 29, 2015, the entire disclosure of which is incorporated herein by reference for all purposes.

FIELD OF THE DISCLOSURE

This relates generally to user inputs, such as mechanical inputs, and more particularly, to providing haptic feedback on such inputs.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. However, devices that accept non-mechanical inputs, such as capacitive touch input, often do not provide tactile feedback to a user.

In addition to touch panels/touch screens, many electronic devices may also have mechanical inputs, such as buttons and/or switches. These mechanical inputs can control power (i.e., on/off) and volume for the electronic devices, among other functions. However, sometimes these mechanical inputs also fail to give a user tactile feedback, such as the "click-click-click" feeling of winding a mechanical alarm clock with a knob.

SUMMARY OF THE DISCLOSURE

Some electronic devices may include mechanical inputs, such as buttons and/or switches. These mechanical inputs can control power (i.e., on/off) and volume for the electronic devices, among other functions. However, sometimes these mechanical inputs can fail to give a user tactile feedback, such as the "click-click-click" feeling of winding a mechanical alarm clock with a knob. It can be beneficial to provide haptic or tactile feedback to a user who is interacting with a mechanical input of an electronic device to give the user a richer interaction experience with the device. Devices that accept non-mechanical inputs, such as touch input, can also provide a better user experience with haptic or tactile feedback provided to a user via their non-mechanical input mechanisms (e.g., via their touch screens). In some examples, such haptic feedback can constitute giving the user a sensation that the user's finger is moving over a ridge, bump or valley feature on an otherwise smooth surface. This type of sensation can simulate the feeling of the user rotating a mechanical knob against the teeth of an internal gear (e.g., the feeling of a detent when turning a rotary input, such as the "click-click-click" feeling of winding a mechanical watch). Haptic feedback as described above can give the user feedback about the effect of the user's input on the electronic device, such as changing the zoom-scale of content displayed on the device in response to the user's rotary input. In some examples, the above haptic feedback can be provided to the user via displacement of a mechanical input that is orthogonal to the direction of the movement of the mechanical input provided by the user (e.g., displacement of a rotary input that is orthogonal to the rotary input's rotational movement). In some examples, the above haptic feedback can be provided to the user via displacement, of a touch-sensitive surface, that is orthogonal to the direction of the rotational movement of the user's finger on the touch-sensitive surface (e.g., when the user is rotating or otherwise manipulating a virtual knob or scroll wheel with circular gestures on a touch-sensitive surface). Various examples of the above are provided in this disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some electronic devices may include mechanical inputs, such as buttons and/or switches. These mechanical inputs can control power (i.e., on/off) and volume for the electronic devices, among other functions. However, sometimes these mechanical inputs can fail to give a user tactile feedback, such as the "click-click-click" feeling of winding a mechanical alarm clock with a knob. It can be beneficial to provide haptic or tactile feedback to a user who is interacting with a mechanical input of an electronic device to give the user a richer interaction experience with the device. Devices that accept non-mechanical inputs, such as touch input, can also provide a better user experience with haptic or tactile feedback provided to a user via their non-mechanical input mechanisms (e.g., via their touch screens). In some examples, such haptic feedback can constitute giving the user a sensation that the user's finger is moving over a ridge, bump or valley feature on an otherwise smooth surface. This type of sensation can simulate the feeling of the user rotating a mechanical knob against the teeth of an internal gear (e.g., the feeling of a detent when turning a rotary input, such as the "click-click-click" feeling of winding a mechanical watch). Haptic feedback as described above can give the user feedback about the effect of the user's input on the electronic device, such as changing the zoom-scale of content displayed on the device in response to the user's rotary input. In some examples, the above haptic feedback can be provided to the user via displacement of a mechanical input that is orthogonal to the direction of the movement of the mechanical input provided by the user (e.g., displacement of a rotary input that is orthogonal to the rotary input's rotational movement). In some examples, the above haptic feedback can be provided to the user via displacement, of a touch-sensitive surface, that is orthogonal to the direction of the rotational movement of the user's finger on the touch-sensitive surface (e.g., when the user is rotating or otherwise manipulating a virtual knob or scroll wheel with circular gestures on a touch-sensitive surface). Various examples of the above are provided in this disclosure.

Figure 1A:
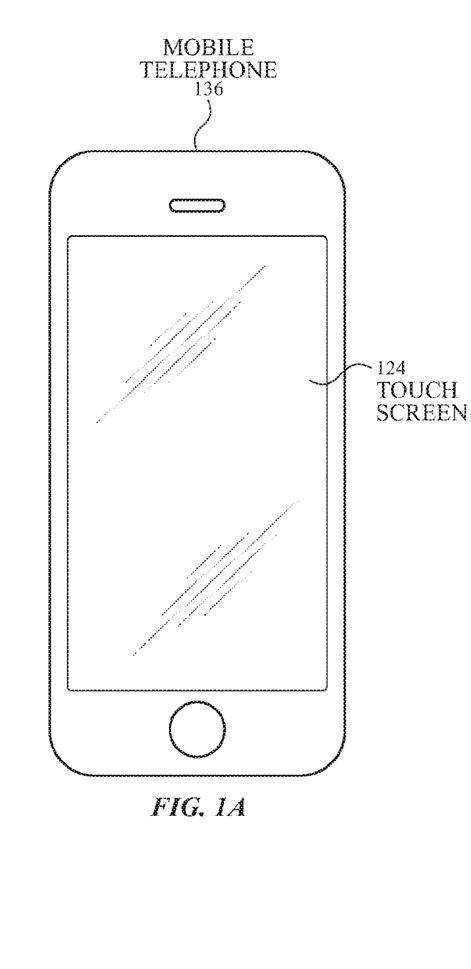
FIGS. 1A-1C show exemplary devices in which the haptic feedback of the disclosure can be implemented.
Figures 1B, 1C:
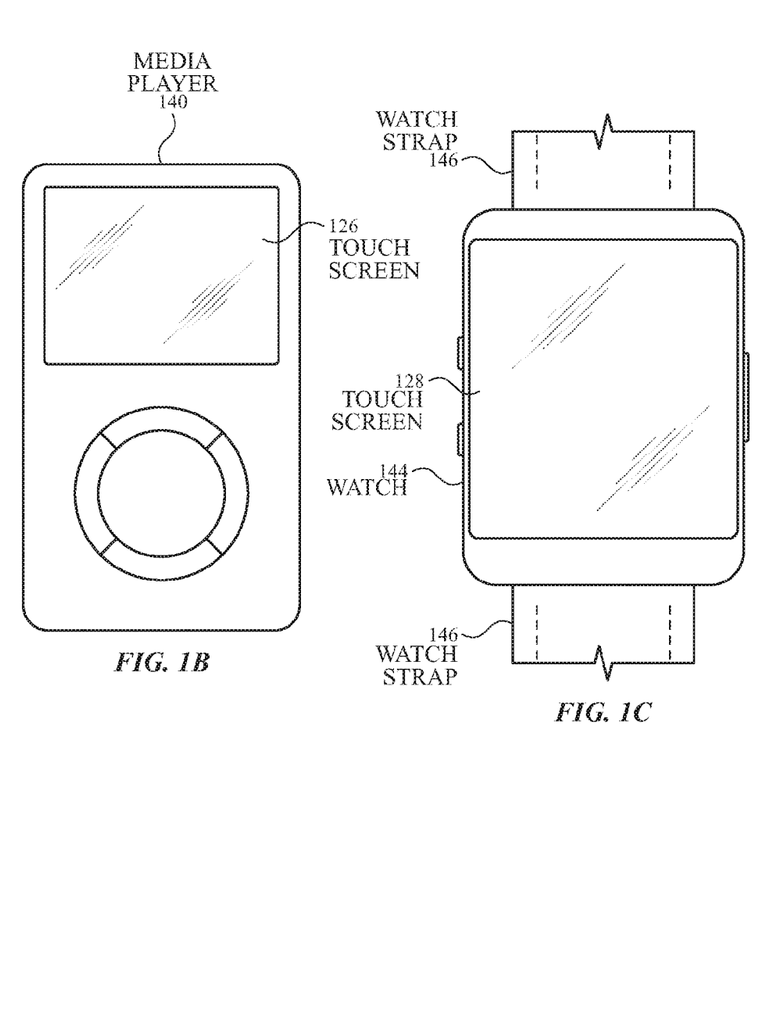

FIGS. 1A-1C show exemplary devices in which the haptic feedback of the disclosure can be implemented. FIG. 1A illustrates an example mobile telephone 136 that includes a touch screen 124. FIG. 1B illustrates an example digital media player 140 that includes a touch screen 126. FIG. 1C illustrates an example watch 144 that includes a touch screen 128. It is understood that the above touch screens can be implemented in other devices as well, such as tablet computers. Further, the above devices can include mechanical inputs, as described with reference to FIG. 2.

In some examples, touch screens 124, 126 and 128 can be based on self-capacitance. A self-capacitance based touch system can include a matrix of small, individual plates of conductive material that can be referred to as touch pixel electrodes. For example, a touch screen can include a plurality of individual touch pixel electrodes, each touch pixel electrode identifying or representing a unique location on the touch screen at which touch or proximity (i.e., a touch or proximity event) is to be sensed, and each touch pixel electrode being electrically isolated from the other touch pixel electrodes in the touch screen. Such a touch screen can be referred to as a pixelated self-capacitance touch screen. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126 and 128 can be based on mutual capacitance. A mutual capacitance based touch system can include drive and sense lines that may cross over each other on different layers, or may be adjacent to each other on the same layer. The crossing or adjacent locations can be referred to as touch pixels. During operation, the drive line can be stimulated with an AC waveform and the mutual capacitance of the touch pixel can be measured. As an object approaches the touch pixel, the mutual capacitance of the touch pixel can change. This change in the mutual capacitance of the touch pixel can be detected and measured by the touch sensing system to determine the positions of multiple objects when they touch, or come in proximity to, the touch screen.

Figure 2:
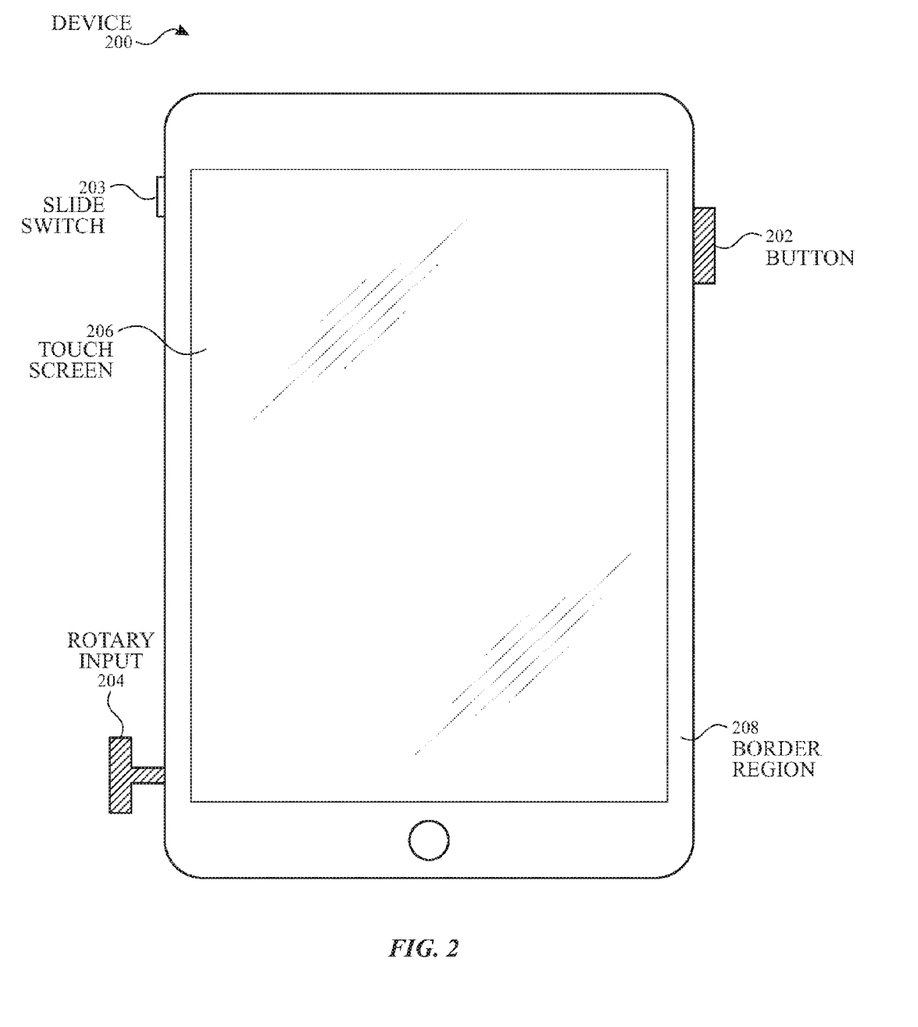
FIG. 2 illustrates an expanded view of an exemplary device according to examples of this disclosure.

FIG. 2 illustrates an expanded view of an exemplary device 200 according to examples of this disclosure. Device 200 can be any of mobile telephone 136, digital media player 140, watch 144, or any other wearable and/or electronic device. Device 200 can include touch screen 206 surrounded by border region 208. Border region 208 can be a region between touch screen 206 and the edge of device 200. In some examples, device 200 may not have border region 208, and may instead have a surface composed substantially of touch screen 206. Device 200 can also include mechanical inputs such as button 202, slide switch 203 and rotary input 204. Button 202 can be, for example, a linear button, which, in operation, can slide into and out of device 200 in a linear fashion. Rotary input 204 can be, for example, a knob. Slide switch 203 can be, for example, a switch that slides vertically along the edge of device 200. Button 202, slide switch 203 and rotary input 204 can be actuated by a user to interact with device 200 in various ways. For example, rotary input 204 can be: a knob by which a user can increase or decrease a volume output by speakers that can be included in device 200; a knob used to scroll up/down through content displayed on touch screen 206; and/or a knob used to zoom into/out of content displayed on the touch screen. Button 202 can be a power button by which a user can turn device 200 on or off. Slide switch 203 can be a slide switch for muting the device. Button 202, slide switch 203 and rotary input 204 are provided by way of example only. It is understood that device 200 can include fewer or more mechanical inputs than the ones illustrated. It is further understood that device 200 can include mechanical inputs other than buttons, slide switches or rotary inputs, such as on/off push/push buttons and multi-position rotary inputs (e.g., a rotary version of a slide switch to select a setting), for example. Other types of mechanical inputs are also within the scope of this disclosure. Non-mechanical inputs, such as touch input, can be provided on the touch screen 206.

Figure 3:
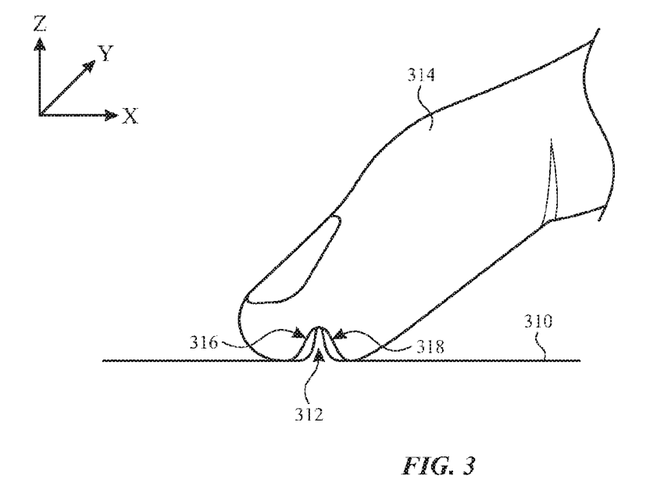
FIG. 3 illustrates an exemplary finger resting on a protruding feature on a surface according to examples of the disclosure.

In some examples, it can be beneficial to provide haptic or tactile feedback to a user who is interacting with a device (e.g., providing a mechanical input to the device), to give the user a richer interaction experience with the device. In some examples, such haptic feedback can constitute giving the user a sensation that the user's finger is moving over a ridge, bump or valley feature on an otherwise smooth surface to simulate the feeling that the user is rotating a mechanical knob against the teeth of an internal gear. FIG. 3 illustrates an exemplary finger 314 resting on protruding feature 312 on surface 310 according to examples of the disclosure. Feature 312 can be any feature that is protruding from surface 310 in the z-direction. In some examples, feature 312 can instead be a recessed feature in surface 310 (e.g., a valley)—the discussion that follows can apply analogously to such a recessed feature.

Finger 314 can be resting or pressed against feature 312 and surface 310. Feature 312 can cause stretching and/or compression of regions 316 and 318 of finger 314, among others, which can be deformed by the feature. A user can sense the existence of feature 312 on surface 310 at least in part as a result of the stretching and/or compression of the user's finger 314 resulting from feature 312. Thus, in some examples, in order to provide the user with the sensation that a feature in the +z or −z directions exists on surface 310 (e.g., to simulate the feeling that the user is rotating a mechanical knob against the teeth of an internal gear), surface 310 can be deflected or otherwise moved in the +z or −z directions to provide such haptic feedback to the user.

However, in some examples, the existence of a feature in the +z or −z directions can be simulated by instead deflecting or moving the surface on which the user's finger is resting in a direction orthogonal to the z-axis (e.g., movement along the x- or y-axes). Such movement, though not along the z-axis, can cause stretching and/or compression of portions of the user's finger that can substantially mimic the stretching and/or compression caused by movement along the z-axis, thus giving the user substantially the same sensation as would a feature in the +z or −z directions. Further, in some examples, orthogonal displacement can be provided more readily than displacement in the z direction, thus allowing for simpler design of mechanical input mechanisms for electronic devices. As previously described, this orthogonal displacement can simulate the sensation that a user is rotating a mechanical knob against the teeth of an internal gear.

Figure 4:
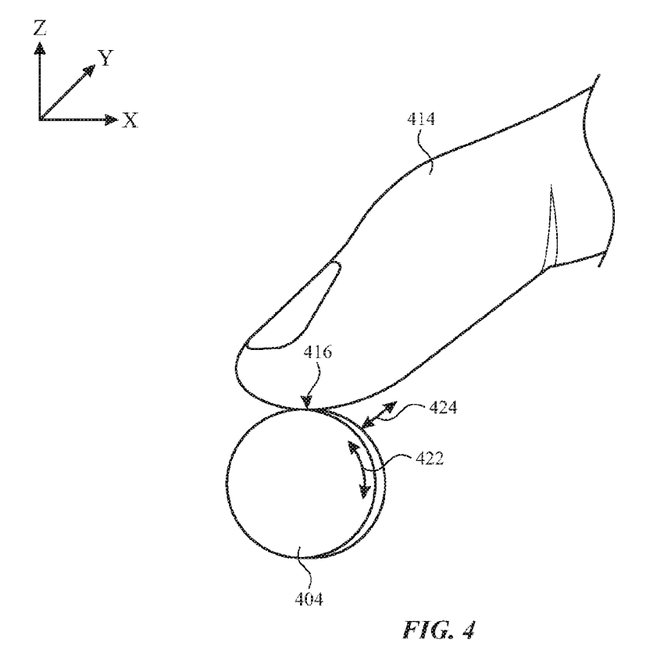
FIG. 4 illustrates an exemplary rotary input that can rotate in a rotational direction as well as be displaced in a direction orthogonal to the rotational direction according to examples of the disclosure.

FIG. 4 illustrates an exemplary rotary input 404 that can rotate in rotational direction 424 as well as be displaced in direction 424 orthogonal to the rotational direction according to examples of the disclosure. Finger 414 can be resting on rotary input 404, and can be providing rotational input to the rotary input in rotational direction 422. In addition to being able to rotate in rotational direction 422, rotary input can also have the ability to be displaced along direction 424 (corresponding to movement along the y-axis in FIG. 4), orthogonal to rotational direction 422 and the movement of finger 414. The displacement of rotary input along direction 424 can cause stretching and/or compression of portion 416 of finger 414 that is touching rotary input 404, and can simulate the feeling of a ridge or detent (e.g., the clicking of a rotary input) associated with the rotary input. In some examples, limiting the displacement of rotary input 404 along direction 424 to be a relatively small displacement (e.g., one millimeter or less) can be most effective in simulating the above ridges or detents. The speed, duration, strength, density and any other characteristic of the displacement of rotary input 404 along direction 424 can be adjusted dynamically to provide a range of haptic feedback to the user, from continuous texture-like sensations to individual clicks or ridges on the rotary input to no haptic feedback at all to provide a smooth rotation of the rotary input. Additionally, while the examples of the disclosure are provided in the context of a rotary input, the examples of the disclosure can analogously be implemented in the context of other mechanical inputs, such as a slider that slides along a first direction and is displaced along a second, orthogonal direction, and can be implemented in the context of non-mechanical inputs (e.g., inputs provided via a touch-sensitive surface), to provide haptic feedback to a user.

Figure 5:
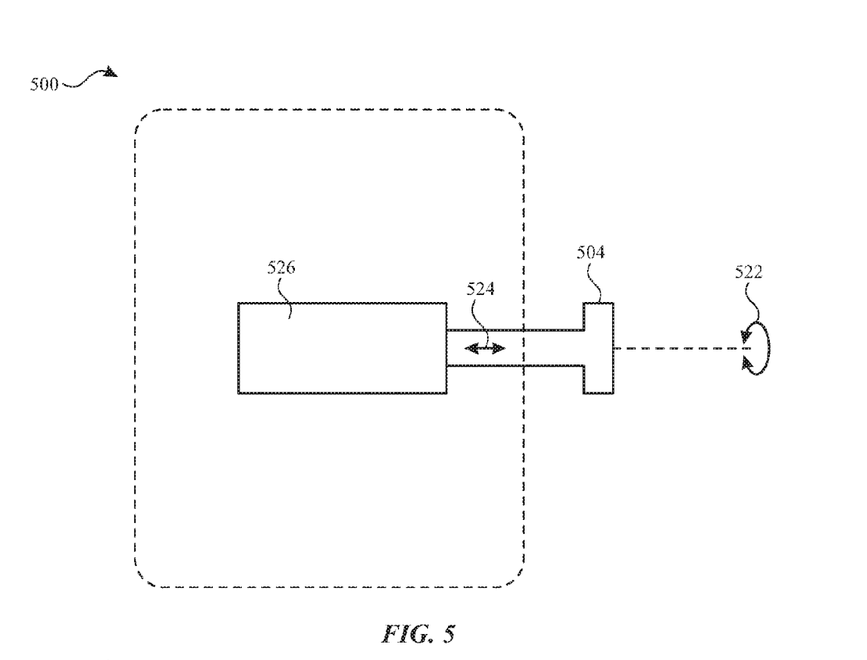
FIG. 5 illustrates an exemplary device including a rotary input that can be rotated along a rotational direction and displaced along a direction orthogonal to the rotational direction according to examples of this disclosure.

FIG. 5 illustrates exemplary device 500 including rotary input 504 that can be rotated along rotational direction 522 and displaced along direction 524 orthogonal to the rotational direction according to examples of this disclosure. In some examples, device 500 can include rotary input 504 to provide various input functionalities such as to increase or decrease a volume output of the device, scroll up/down through content displayed on the device, and/or zoom into/out of content displayed on the device, for example; other functionalities are similarly contemplated. Rotary input 504 can be coupled to mechanical input sensor and actuator 526 in device 500, which can both sense the rotational movement of the rotary input along rotational direction 522, and provide displacement of the rotary input along direction 524. Mechanical input sensor and actuator 526 can be programmable, such that any number of characteristics of the displacement of rotary input 504 along direction 524 can be adjusted, as desired. For example, the amplitude of the displacement, the duration of the displacement, the frequency of the displacement (e.g., every 30 degrees of rotation), the velocity of the displacement, and any other characteristic of the displacement can be dynamically varied to provide the desired user experience on device 500.

In some examples, the characteristics of the displacement of rotary input 504 along direction 524 can be based on the context of device 500. For example, if device 500 is running and displaying a mapping application, rotary input 504 can be used to zoom into and out of a displayed map. In such circumstances, mechanical input sensor and actuator 526 can provide a linear displacement of rotary input 504 along direction 524 each time the scale of the map is changed in response to the rotational input of the rotary input (e.g., switching from a five-mile scale to a one-mile scale), so as to simulate a click of the rotary input (e.g., a detent) and to provide the user haptic feedback that the scale of the map has been changed.

As another example, if device 500 is running and displaying a timing application, rotary input 504 can be used to set the duration of a timer. In such circumstances, mechanical input sensor and actuator 526 can provide a linear displacement of rotary input 504 along direction 524 each time the duration of the timer is changed by a predetermined amount (e.g., every minute, every five minutes, etc.) in response to the rotational input of the rotary input, so as to simulate a click of the rotary input (e.g., a detent) and to provide the user haptic feedback that the duration of the timer has been changed by a predetermined amount. Other circumstances in which the characteristics of the displacement of rotary input 504 along direction 524 can be based on the context of device 500 (e.g., the current state of the device, what application(s) are running on the device, what user interface(s) are being displayed on the device, etc.) are similarly within the scope of the disclosure. In non-mechanical examples, element 526 can be an actuator responsive to signals from a touch controller (not shown) indicating that a certain type of touch input is being detected (e.g., rotational or circular touch inputs). In these examples, the actuator may provide haptic feedback to the entire device, or may provide localized haptic feedback if permitted by the structural elements of the device.

Figure 6:
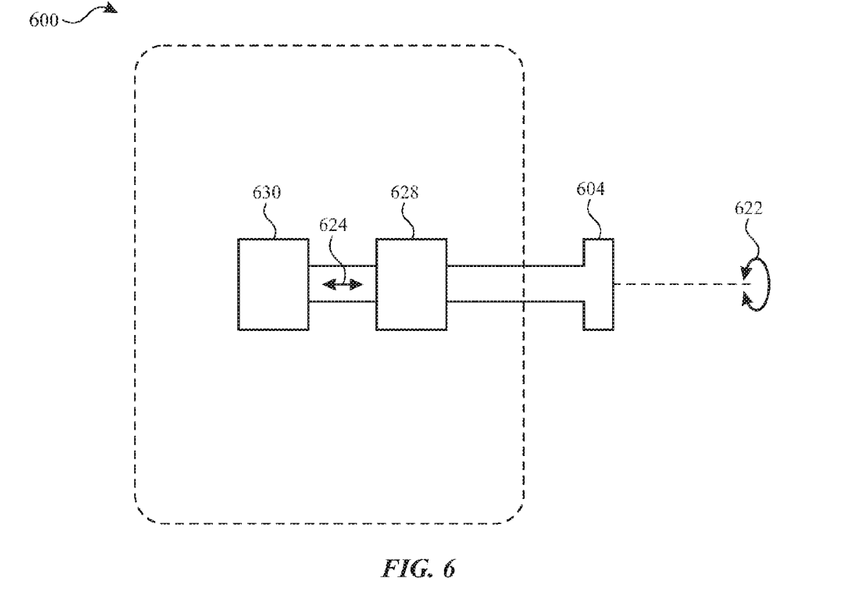
FIG. 6 illustrates an exemplary device including a mechanical input sensor and a mechanical input actuator according to examples of the disclosure.

In some examples, the device can have a separate mechanical input sensor and a separate mechanical input actuator. FIG. 6 illustrates exemplary device 600 including mechanical input sensor 628 and mechanical input actuator 630 according to examples of the disclosure. Instead of single mechanical input sensor and actuator 526 in FIG. 5, device 600 can include a separate mechanical input sensor 628 and a separate mechanical input actuator 630. Mechanical input sensor 628 can be coupled to rotary input 604 and can sense the rotational movement of the rotary input along rotational direction 622. Mechanical input actuator 630 can be coupled to mechanical input sensor 628 and can provide displacement of mechanical input sensor 628, and thus rotary input 604, along direction 624. Mechanical input actuator 630 can be in communication with mechanical input sensor 628 such that the mechanical input actuator can have access to the input information provided by rotation of rotary input 604. Mechanical input actuator 630 and/or mechanical input sensor 628 can be programmable such that any number of characteristics of the displacement of rotary input 604 along direction 624 can be adjusted, as discussed above with respect to FIG. 5.

Figure 7:
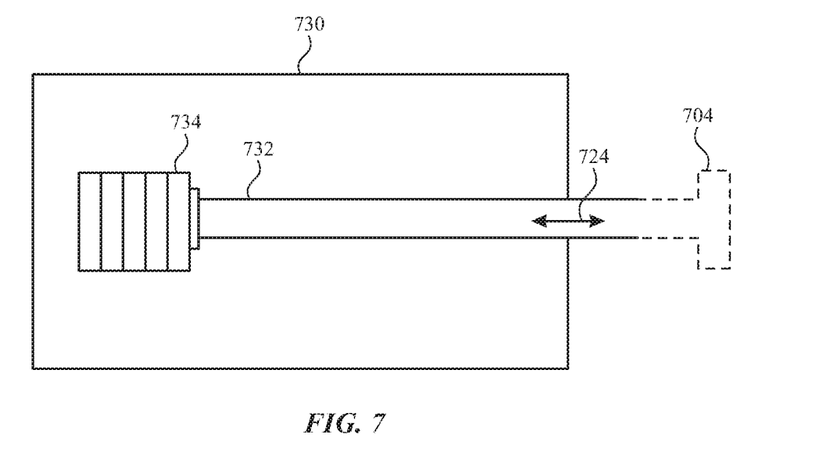
FIG. 7 illustrates an exemplary piezoelectric implementation of the mechanical input sensor and actuator of FIG. 5 or the mechanical input actuator of FIG. 6 according to examples of the disclosure.

FIG. 7 illustrates an exemplary piezoelectric implementation of mechanical input sensor and actuator 526 of FIG. 5 or mechanical input actuator 630 of FIG. 6 according to examples of the disclosure. Mechanical input actuator 730 (or mechanical input sensor and actuator) can include piezoelectric element 734 coupled to shaft 732. Shaft 732 can be coupled, directly or indirectly (e.g., via mechanical input sensor 628 in FIG. 6), to rotary input 704. Piezoelectric element 734 can include one or more piezoelectric layers. Upon application of a voltage across the one or more piezoelectric layers of piezoelectric element 734, the piezoelectric layers can expand or contract, causing a displacement of shaft 732 along direction 724. The magnitude of the voltage applied to the piezoelectric layers can control the magnitude of the displacement of shaft 732. This displacement of shaft 732 can result in a displacement of rotary input 704 along direction 724, as previously discussed.

Figure 8:
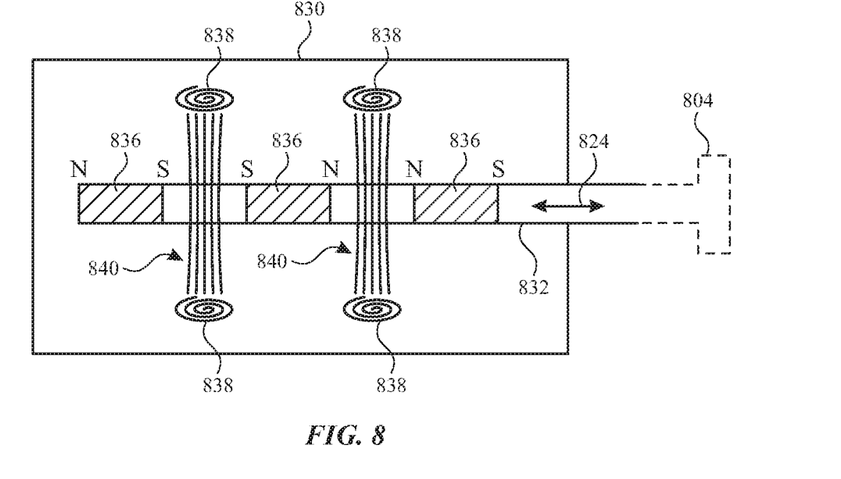
FIG. 8 illustrates an exemplary magnetic implementation of the mechanical input sensor and actuator of FIG. 5 or the mechanical input actuator of FIG. 6 according to examples of the disclosure.

FIG. 8 illustrates an exemplary magnetic implementation of mechanical input sensor and actuator 526 of FIG. 5 or mechanical input actuator 630 of FIG. 6 according to examples of the disclosure. Mechanical input actuator 830 (or mechanical input sensor and actuator) can include shaft 832. Shaft 832 can be coupled, directly or indirectly (e.g., via mechanical input sensor 628 in FIG. 6), to rotary input 804. Shaft 832 can include one or more magnets 836, which can be arranged such that like poles of the magnets are oriented towards each other (e.g., the north pole of a magnet is adjacent to the north pole of an adjacent magnet, and the south pole of a magnet is adjacent to the south pole of an adjacent magnet). Because the like poles of magnets 836 can be oriented towards each other, relatively high intensity magnetic fields 840 can exist between the magnets. Mechanical input actuator 830 can include coils 838, which can be positioned to substantially align with fields 840 when shaft 832 is in a neutral (i.e., non-displaced) position. Current passing through one or more of coils 838 can modulate fields 840, and can cause shaft 832 to be displaced along direction 824. The magnitude of the current applied to coils 838 can control the magnitude of the displacement of shaft 832. This displacement of shaft 832 can result in a displacement of rotary input 804 along direction 824, as previously discussed.

Figure 9A:
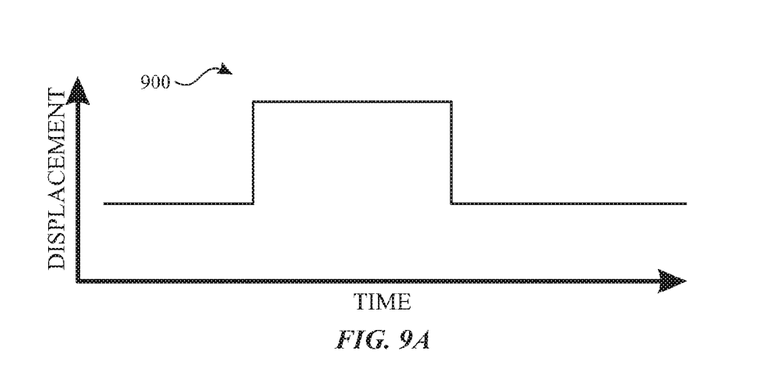
FIGS. 9A-9D illustrate exemplary rotary input displacement profiles according to examples of the disclosure.

The displacement of the rotary input of the disclosure can have any number of displacement profiles. FIGS. 9A-9D illustrate exemplary rotary input displacement profiles according to examples of the disclosure. FIG. 9A illustrates exemplary step-pulse displacement profile 900. In step-pulse displacement profile 900, the full displacement of the rotary input can occur substantially immediately, followed by a return of the rotary input to a no-displacement state in a relatively short time period (e.g., tens of milliseconds). In some examples, step-pulse displacement profile 900, and the displacement profiles of FIGS. 9B-9D, can correspond to voltage (e.g., as used in FIG. 7) or current (e.g., as used in FIG. 8) profiles used to drive the displacement of the rotary input.

Figure 9B:
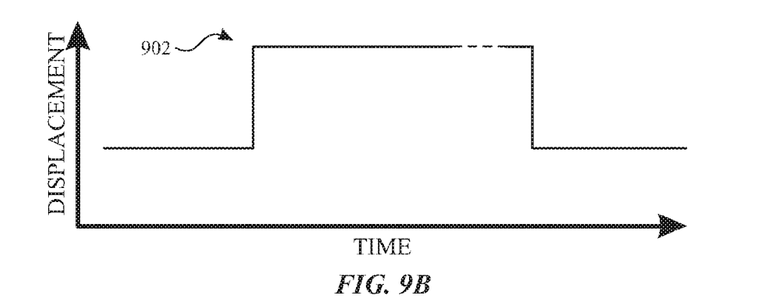

FIG. 9B illustrates exemplary step displacement profile 902. In step displacement profile 902, the full displacement of the rotary input can occur substantially immediately; however, the rotary input may not return to a no-displacement state for a relatively long time period (e.g., multiple seconds). In some examples, the return of the rotary input to a no-displacement state may itself be reserved for another haptic event that calls for haptic feedback on the rotary input.

Figure 9C:
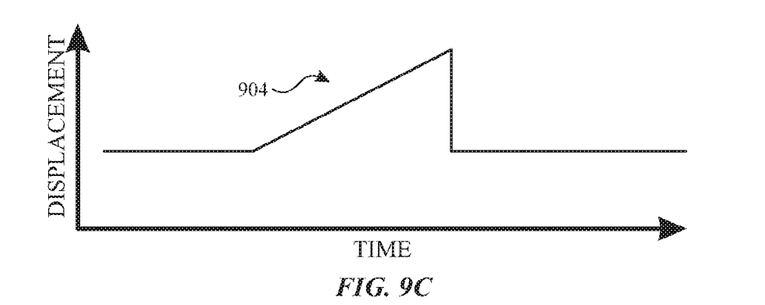

FIG. 9C illustrates exemplary triangular-pulse displacement profile 904. In triangular-pulse displacement profile 904, the full displacement of the rotary input can occur gradually, and the rotary input can return to a no-displacement state substantially immediately when full displacement is reached.

Figure 9D:
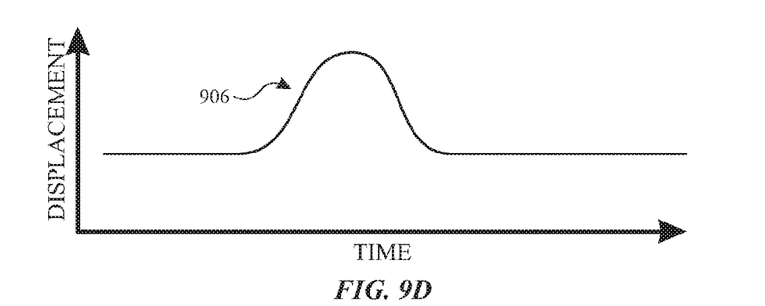

FIG. 9D illustrates exemplary Gaussian-pulse displacement profile 906. In Gaussian-pulse displacement profile 906, the full displacement of the rotary input can occur gradually according to a Gaussian function, and similarly, the rotary input can return to a no-displacement state gradually according to the Gaussian function. It is understood that the displacement profiles provided in FIGS. 9A-9D are exemplary only, and that other displacement profiles may be used within the scope of the disclosure.

Figure 10:
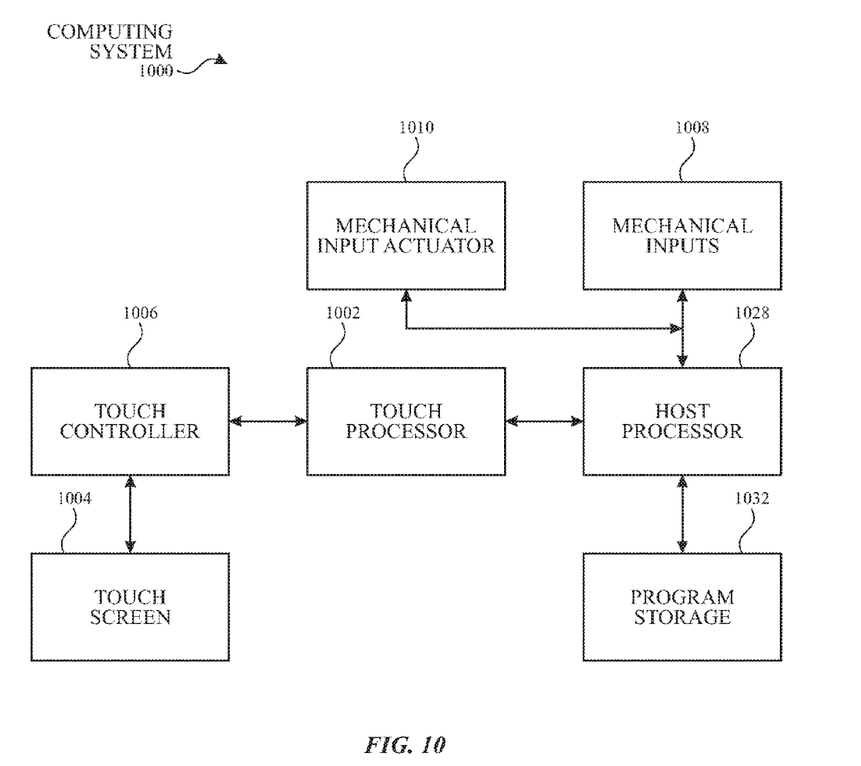
FIG. 10 illustrates an example computing system for implementing the mechanical input displacement according to examples of the disclosure.

FIG. 10 illustrates an example computing system 1000 for implementing the mechanical input displacement according to examples of the disclosure. Computing system 1000 can be included in, for example, mobile telephone 136, media player 140, watch 144 or any mobile or non-mobile computing device and/or wearable device that includes a mechanical input mechanism (e.g., rotary input 204). Computing system 1000 can include a touch sensing system including one or more touch processors 1002, touch controller 1006 and touch screen 1004. Touch screen 1004 can be a touch screen adapted to sense touch inputs, as described in this disclosure. Touch controller 1006 can include circuitry and/or logic configured to sense touch inputs on touch screen 1004. In some examples, touch controller 1006 and touch processor 1002 can be integrated into a single application specific integrated circuit (ASIC).

Computing system 1000 can also include host processor 1028 for receiving outputs from touch processor 1002 and performing actions based on the outputs. Host processor 1028 can be connected to program storage 1032. For example, host processor 1028 can contribute to generating an image on touch screen 1004 (e.g., by controlling a display controller to display an image of a user interface (UI) on the touch screen), and can use touch processor 1002 and touch controller 1006 to detect one or more touches on or near touch screen 1004. Host processor 1028 can also contribute to sensing and/or processing mechanical inputs 1008 (e.g., rotary input 204), and controlling mechanical input actuator 1010 (e.g., rotary input displacement), as described in this disclosure. The touch inputs from touch screen 1004 and/or mechanical inputs 1008 can be used by computer programs stored in program storage 1032 to perform actions in response to the touch and/or mechanical inputs. For example, touch inputs can be used by computer programs stored in program storage 1032 to perform actions that can include moving an object such as a cursor or pointer, scrolling or panning, adjusting control settings, opening a file or document, viewing a menu, making a selection, executing instructions, operating a peripheral device connected to the host device, answering a telephone call, placing a telephone call, and other actions that can be performed in response to touch inputs. Mechanical inputs 1008 can be used by computer programs stored in program storage 1032 to perform actions that can include changing a volume level, locking the touch screen, turning on the touch screen, taking a picture, and other actions that can be performed in response to mechanical inputs. Host processor 1028 can cause displacement of mechanical inputs 1008 by mechanical input actuator 1010 based on the mechanical inputs and/or the context of computing system 1000 (e.g., what application(s) are running on the computing system, what user interface(s) are displayed by the computing system, etc.), as previously described. Host processor 1028 can also perform additional functions that may not be related to touch and/or mechanical input processing.

Note that one or more of the functions described above can be performed by firmware stored in memory in computing system 1000 and executed by touch processor 1002, or stored in program storage 1032 and executed by host processor 1028. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Thus, the examples of the disclosure provide various ways to provide haptic feedback to a user by displacing a mechanical input in one direction to simulate a haptic feature in another direction.

Therefore, according to the above, some examples of the disclosure are directed to an electronic device comprising: a mechanical input configured to move in a first direction in response to an input at the mechanical input; a mechanical input sensor coupled to the mechanical input and configured to sense the input at the mechanical input based on the movement of the mechanical input in the first direction; and a mechanical input actuator coupled to the mechanical input and configured to displace the mechanical input in a second direction, different from the first direction. Additionally or alternatively to one or more of the examples disclosed above, in some examples, the second direction is orthogonal to the first direction. Additionally or alternatively to one or more of the examples disclosed above, in some examples, the mechanical input comprises a rotary input configured to rotate in the first direction in response to the input. Additionally or alternatively to one or more of the examples disclosed above, in some examples, the mechanical input actuator is configured to displace the mechanical input in the second direction while the mechanical input is moving in the first direction. Additionally or alternatively to one or more of the examples disclosed above, in some examples, the mechanical input sensor and the mechanical input actuator are separate components, and the mechanical input actuator is configured to displace the mechanical input in the second direction by displacing the mechanical input sensor in the second direction. Additionally or alternatively to one or more of the examples disclosed above, in some examples, the mechanical input actuator comprises: a shaft coupled to the mechanical input; and a piezoelectric element coupled to the shaft, wherein a voltage applied to the piezoelectric element causes displacement of the shaft and the mechanical input in the second direction. Additionally or alternatively to one or more of the examples disclosed above, in some examples, the mechanical input actuator comprises: a shaft coupled to the mechanical input, the shaft including a plurality of magnetic elements configured to create one or more magnetic fields between the magnetic elements; and one or more coils configured to modulate the one or more magnetic fields, wherein a current applied to the one or more coils causes modulation of the one or more magnetic fields and displacement of the shaft and the mechanical input in the second direction. Additionally or alternatively to one or more of the examples disclosed above, in some examples, the electronic device further comprises a processor coupled to the mechanical input sensor and the mechanical input actuator, the processor capable of adjusting one or more characteristics of the displacement of the mechanical input in the second direction based on a context of the electronic device. Additionally or alternatively to one or more of the examples disclosed above, in some examples, the electronic device further comprises: a display coupled to the processor, wherein the processor is further capable of: in accordance with a determination that a first application is displayed on the display, controlling the mechanical input actuator to displace the mechanical input in the second direction with a first characteristic in accordance with the input at the mechanical input; and in accordance with a determination that a second application, different from the first application, is displayed on the display, controlling the mechanical input actuator to displace the mechanical input in the second direction with a second characteristic, different from the first characteristic, in accordance with the input at the mechanical input. Additionally or alternatively to one or more of the examples disclosed above, in some examples, the one or more characteristics of the displacement comprise one or more of an amplitude of the displacement, a duration of the displacement, a frequency of the displacement, and a velocity of the displacement.

Some examples of the disclosure are directed to an electronic device comprising: a mechanical input means for receiving an input and configured to move in a first direction in response to the input; a mechanical input sensor means for sensing the input at the mechanical input means based on the movement of the mechanical input means in the first direction; and a mechanical input actuator means for displacing the mechanical input means in a second direction, different from the first direction. Additionally or alternatively to one or more of the examples disclosed above, in some examples, the second direction is orthogonal to the first direction. Additionally or alternatively to one or more of the examples disclosed above, in some examples, the mechanical input means is configured to rotate in the first direction in response to the input. Additionally or alternatively to one or more of the examples disclosed above, in some examples, the mechanical input actuator means is for displacing the mechanical input in the second direction while the mechanical input is moving in the first direction. Additionally or alternatively to one or more of the examples disclosed above, in some examples, the mechanical input sensor means and the mechanical input actuator means are separate components, and the mechanical input actuator means is for displacing the mechanical input means in the second direction by displacing the mechanical input sensor means in the second direction. Additionally or alternatively to one or more of the examples disclosed above, in some examples, the electronic device further comprises a processor means capable of adjusting one or more characteristics of the displacement of the mechanical input means in the second direction based on a context of the electronic device. Additionally or alternatively to one or more of the examples disclosed above, in some examples, the electronic device further comprises: display means, wherein the processor means is further capable of: in accordance with a determination that a first application is displayed on the display means, controlling the mechanical input actuator means to displace the mechanical input means in the second direction with a first characteristic in accordance with the input at the mechanical input means; and in accordance with a determination that a second application, different from the first application, is displayed on the display means, controlling the mechanical input actuator means to displace the mechanical input means in the second direction with a second characteristic, different from the first characteristic, in accordance with the input at the mechanical input means. Additionally or alternatively to one or more of the examples disclosed above, in some examples, the one or more characteristics of the displacement comprise one or more of an amplitude of the displacement, a duration of the displacement, a frequency of the displacement, and a velocity of the displacement.

Some examples of the disclosure are directed to a method comprising: receiving an input at a mechanical input, the mechanical input configured to move in a first direction in response to the input; sensing the input at the mechanical input based on the movement of the mechanical input in the first direction; and displacing the mechanical input in a second direction, different from the first direction.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
   a mechanical input configured to move in a first direction in response to an input at the mechanical input;
   a mechanical input sensor coupled to the mechanical input and configured to sense the input at the mechanical input based on the movement of the mechanical input in the first direction;
   a mechanical input actuator coupled to the mechanical input and configured to displace the mechanical input in a second direction, different from the first direction; and
   a processor coupled to the mechanical input sensor, the mechanical input actuator, and a display, wherein the processor is capable of:
      in accordance with a determination that the input at the mechanical input is providing input to a first application displayed on the display of the electronic device, controlling the mechanical input actuator to displace the mechanical input in the second direction with a first motion characteristic; and
      in accordance with a determination that the input at the mechanical input is providing input to a second application displayed on the display of the electronic device, different from the first application, controlling the mechanical input actuator to displace the mechanical input in the second direction with a second motion characteristic, different from the first motion characteristic.

2. The electronic device of claim 1, wherein the second direction is orthogonal to the first direction.

3. The electronic device of claim 1, wherein the mechanical input comprises a rotary input configured to rotate in the first direction in response to the input.

4. The electronic device of claim 1, wherein the mechanical input actuator is configured to displace the mechanical input in the second direction while the mechanical input is moving in the first direction.

5. The electronic device of claim 1, wherein the mechanical input sensor and the mechanical input actuator are separate components, and the mechanical input actuator is configured to displace the mechanical input in the second direction by displacing the mechanical input sensor in the second direction.

6. The electronic device of claim 1, wherein the mechanical input actuator comprises:
   a shaft coupled to the mechanical input; and
   a piezoelectric element coupled to the shaft, wherein a voltage applied to the piezoelectric element causes displacement of the shaft and the mechanical input in the second direction.

7. The electronic device of claim 1, wherein the mechanical input actuator comprises:
   a shaft coupled to the mechanical input, the shaft including a plurality of magnetic elements configured to create one or more magnetic fields between the magnetic elements; and
   one or more coils configured to modulate the one or more magnetic fields, wherein a current applied to the one or more coils causes modulation of the one or more magnetic fields and displacement of the shaft and the mechanical input in the second direction.

8. The electronic device of claim 1, wherein the first and second motion characteristics of the displacement comprise one or more of an amplitude of the displacement, a duration of the displacement, a frequency of the displacement, and a velocity of the displacement.

9. The electronic device of claim 8, wherein the first motion characteristic is a displacement at a first frequency of the displacement, and the second motion characteristic is a displacement at a second frequency of the displacement.

10. The electronic device of claim 8, wherein the first motion characteristic is a displacement with a first amplitude of displacement, and the second motion characteristic is a displacement with a second amplitude of displacement, larger than the first amplitude of displacement.

11. An electronic device comprising:
- a mechanical input means for receiving an input and configured to move in a first direction in response to the input;
- a mechanical input sensor means for sensing the input at the mechanical input means based on the movement of the mechanical input means in the first direction;
- a mechanical input actuator means for displacing the mechanical input means in a second direction, different from the first direction; and
- a processor coupled to the mechanical input sensor means, the mechanical input actuator means, and a display means, wherein the processor is capable of:
  - in accordance with a determination that the input at the mechanical input means is providing input to a first application displayed on the display means of the electronic device, controlling the mechanical input actuator means to displace the mechanical input means in the second direction with a first motion characteristic; and
  - in accordance with a determination that the input at the mechanical input means is providing input to a second application displayed on the display means of the electronic device, different from the first application, controlling the mechanical input actuator means to displace the mechanical input means in the second direction with a second motion characteristic, different from the first motion characteristic.

12. The electronic device of claim 11, wherein the second direction is orthogonal to the first direction.

13. The electronic device of claim 11, wherein the mechanical input means is configured to rotate in the first direction in response to the input.

14. The electronic device of claim 11, wherein the mechanical input actuator means is for displacing the mechanical input means in the second direction while the mechanical input means is moving in the first direction.

15. The electronic device of claim 11, wherein the mechanical input sensor means and the mechanical input actuator means are separate components, and the mechanical input actuator means is for displacing the mechanical input means in the second direction by displacing the mechanical input sensor means in the second direction.

16. The electronic device of claim 11, wherein the first and second motion characteristics of the displacement comprise one or more of an amplitude of the displacement, a duration of the displacement, a frequency of the displacement, and a velocity of the displacement.

17. The electronic device of claim 16, wherein the first motion characteristic is a displacement at a first frequency of the displacement, and the second motion characteristic is a displacement at a second frequency of the displacement.

18. The electronic device of claim 16, wherein the first motion characteristic is a displacement with a first amplitude of displacement, and the second motion characteristic is a displacement with a second amplitude of displacement, larger than the first amplitude of displacement.

19. A non-transitory computer readable storage medium having stored thereon a set of instructions stored thereon, that when executed by a processor causes the processor to:
- sense an input at a mechanical input by a mechanical input sensor based on the movement of the mechanical input in the first direction; and
- displace the mechanical input in a second direction, different from the first direction;
- in accordance with a determination that the input at the mechanical input is providing input to a first application displayed on a display of an electronic device, control the mechanical input actuator to displace the mechanical input in the second direction with a first motion characteristic; and
- in accordance with a determination that the input at the mechanical input is providing input to a second application displayed on the display of the electronic device, different from the first application, control the mechanical input actuator to displace the mechanical input in the second direction with a second motion characteristic, different from the first motion characteristic.

* * * * *